(12) United States Patent
Liang et al.

(10) Patent No.: US 10,386,694 B2
(45) Date of Patent: Aug. 20, 2019

(54) DISPLAY PANEL AND DRIVING METHOD THEREOF

(71) Applicant: BOE TECHNOLOGY GROUP CO., LTD., Beijing (CN)

(72) Inventors: Pengxia Liang, Beijing (CN); Jing Yu, Beijing (CN); Ken Wen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/720,049

(22) Filed: Sep. 29, 2017

(65) Prior Publication Data

US 2018/0088434 A1    Mar. 29, 2018

(30) Foreign Application Priority Data

Sep. 29, 2016  (CN) .......................... 2016 1 0866855

(51) Int. Cl.

| G02F 1/17 | (2019.01) |
|---|---|
| G09G 3/34 | (2006.01) |
| G02F 1/167 | (2019.01) |
| G02F 1/1335 | (2006.01) |
| G02F 1/1362 | (2006.01) |
| G02F 1/1675 | (2019.01) |

(52) U.S. Cl.
CPC ............ *G02F 1/167* (2013.01); *G02F 1/1362* (2013.01); *G02F 1/133553* (2013.01); *G02F 1/172* (2013.01); *G02F 2001/133562* (2013.01); *G02F 2001/1678* (2013.01); *G02F 2203/023* (2013.01); *G09G 3/344* (2013.01); *G09G 2320/066* (2013.01)

(58) Field of Classification Search
CPC .............. G02F 1/167; G02F 1/133553; G02F 2001/133607; G02F 1/13718
See application file for complete search history.

(56) References Cited

U.S. PATENT DOCUMENTS

| 6,359,285 B1 * | 3/2002 | Tasaki ................... G01T 1/2012 |
|---|---|---|
| | | 250/473.1 |
| 8,033,706 B1 * | 10/2011 | Kelly ................... G02B 6/0036 |
| | | 362/307 |

(Continued)

FOREIGN PATENT DOCUMENTS

JP         2009223301 A    * 10/2009

*Primary Examiner* — Lucy P Chien
(74) *Attorney, Agent, or Firm* — Nath, Goldberg & Meyer; Joshua B. Goldberg; Daniel Bissing

(57) ABSTRACT

Embodiments of the present disclosure provide a display panel and a driving method thereof. The display panel includes a first substrate and a second substrate which are aligned and assembled into a cell, wherein the first substrate includes a first base body, a total internal reflection structure and a first electrode are provided at a side of the first base body facing to the second substrate, and the second substrate includes a second base body and a second electrode which is provided at a side of the second base body facing to the first substrate. The display panel further includes cholesteric liquid crystal provided between the first and second substrates, charged light-absorbing particles are mixed in the cholesteric liquid crystal, and a refractive index of the cholesteric liquid crystal is smaller than each of refractive indexes of the total internal reflection structure and the light-absorbing particles.

12 Claims, 1 Drawing Sheet

(56) References Cited

U.S. PATENT DOCUMENTS

| | | | | |
|---|---|---|---|---|
| 2001/0035932 A1* | 11/2001 | Suzuki | ............ | G02F 1/141 |
| | | | | 349/169 |
| 2002/0154264 A1* | 10/2002 | Suzuki | ............ | G02F 1/1339 |
| | | | | 349/153 |
| 2007/0052879 A1* | 3/2007 | Uehara | ............ | G02F 1/1323 |
| | | | | 349/56 |
| 2007/0146625 A1* | 6/2007 | Ooi | ............ | G02B 3/08 |
| | | | | 349/200 |
| 2008/0198281 A1* | 8/2008 | Klein | ............ | C09K 19/52 |
| | | | | 349/33 |
| 2011/0122346 A1* | 5/2011 | Nose | ............ | G02F 1/1347 |
| | | | | 349/106 |
| 2015/0323833 A1* | 11/2015 | Xie | ............ | G02F 1/133555 |
| | | | | 349/33 |

* cited by examiner

DISPLAY PANEL AND DRIVING METHOD THEREOF

CROSS-REFERENCE TO RELATED APPLICATIONS

The present application claims the priority of Chinese Patent Application No. 201610866855.1, filed on Sep. 29, 2016, the contents of which are incorporated herein in their entirety by reference.

TECHNICAL FIELD

Embodiments of the present disclosure relate to the field of electronic ink display technology, and in particular, relate to a display panel and a driving method thereof.

BACKGROUND

An electronic ink display panel adopts a display mode of total internal reflection-type. External light passes through a first substrate (i.e., a substrate close to a viewer) of the electronic ink display panel to enter into the interior thereof. The display panel is in a bright state when at least a part of the incident light is reflected inside the display panel and emitted from the first substrate, whereas the display panel is a dark state when the incident light is not emitted from the first substrate, for example, due to being absorbed inside the display panel. In the conventional electronic ink display panel, a part of the incident light will be reflected by a second substrate (i.e., a substrate far away from the viewer) and emitted from the first substrate in the dark state, thereby increasing the brightness of the dark state, which results in reduction of contrast of the display panel.

SUMMARY

To at least partially solve the problem of reduction of contrast of the conventional electronic ink display panel, embodiments of the present disclosure provide a display panel and a driving method thereof, which ensure both a higher brightness and no reduction of contrast.

Some embodiments of the present disclosure provide a display panel, which includes a first substrate and a second substrate which are aligned and assembled into a cell, wherein the first substrate includes a first base body, a total internal reflection structure and a first electrode are provided at a side of the first base body facing to the second substrate, the second substrate includes a second base body and a second electrode which is provided at a side of the second base body facing to the first substrate; and the display panel further includes cholesteric liquid crystal provided between the first substrate and the second substrate, charged light-absorbing particles are mixed in the cholesteric liquid crystal, and a refractive index of the cholesteric liquid crystal is smaller than each of a refractive index of the total internal reflection structure and a refractive index of the light-absorbing particles.

In an embodiment, the total internal reflection structure includes a plurality of hemisphere microstructures protruding towards the second substrate; and the display panel further includes a plurality of pixel units, each of which is provided with one or more of the hemisphere microstructures therein.

In an embodiment, the first electrode is provided between the first base body and the total internal reflection structure.

In an embodiment, the second electrode is made of a transparent conductive material.

In an embodiment, the second substrate further includes a light-absorbing layer.

In an embodiment, the display panel further includes a plurality of pixel units, and a light-absorbing wall is provided between any two adjacent ones of the pixel units.

In an embodiment, the light-absorbing wall is provided on the second substrate.

In an embodiment, the first electrode is a common electrode, and the second electrode is a pixel electrode.

Some embodiments of the present disclosure further provide a driving method of the display panel according to the present disclosure, wherein a number of the second electrodes is equal to or greater than 2, and the driving method includes steps of:

when any one of the pixel units is to enter into a bright state, applying a first driving voltage across the first electrode and the second electrode corresponding to the pixel unit, such that the light-absorbing particles are absorbed on the second substrate, and the cholesteric liquid crystal is in a planar state; and when any one of the pixel units is to enter into a dark state, applying a second driving voltage across the first electrode and the second electrode corresponding to the pixel unit, such that the light-absorbing particles are absorbed on the first substrate, and the cholesteric liquid crystal is in a focal conic state.

In an embodiment, the driving method further includes steps of: when the pixel unit is to be maintained in the bright state, cancelling application of the first driving voltage across the first electrode and the second electrode corresponding to the pixel unit; and when the pixel unit is to be maintained in the dark state, cancelling application of the second driving voltage across the first electrode and the second electrode corresponding to the pixel unit.

Some embodiments of the present disclosure further provide another driving method of the display panel according to the present disclosure, wherein a number of the first electrodes is equal to or greater than 2, and the driving method includes steps of:

when any one of the pixel units is to enter into a bright state, applying a first driving voltage across the second electrode and the first electrode corresponding to the pixel unit, such that the light-absorbing particles are absorbed on the second substrate, and the cholesteric liquid crystal is in a planar state; and when any one of the pixel units is to enter into a dark state, applying a second driving voltage across the second electrode and the first electrode corresponding to the pixel unit, such that the light-absorbing particles are absorbed on the first substrate, and the cholesteric liquid crystal is in a focal conic state.

In an embodiment, the driving method further includes steps of: when the pixel unit is to be maintained in the bright state, cancelling application of the first driving voltage across the second electrode and the first electrode corresponding to the pixel unit; and when the pixel unit is to be maintained in the dark state, cancelling application of the second driving voltage across the second electrode and the first electrode corresponding to the pixel unit.

DETAILED DESCRIPTION

In order to make a person skilled in the art better understand the technical solutions of the present disclosure, the present disclosure will be described in detail below with reference to embodiments and the accompanying drawings.

Figure 1:
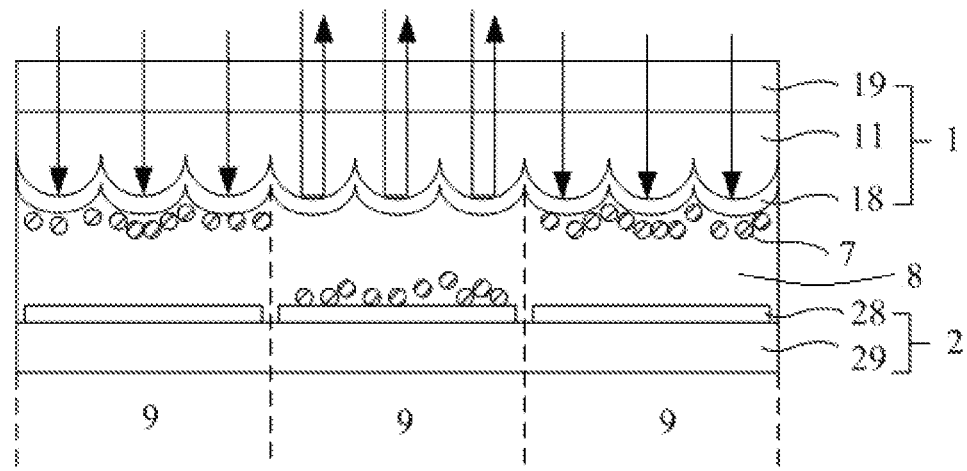
FIG. 1 is a schematic diagram showing a structure of a display panel according to embodiments of the present disclosure.
Figure 2:
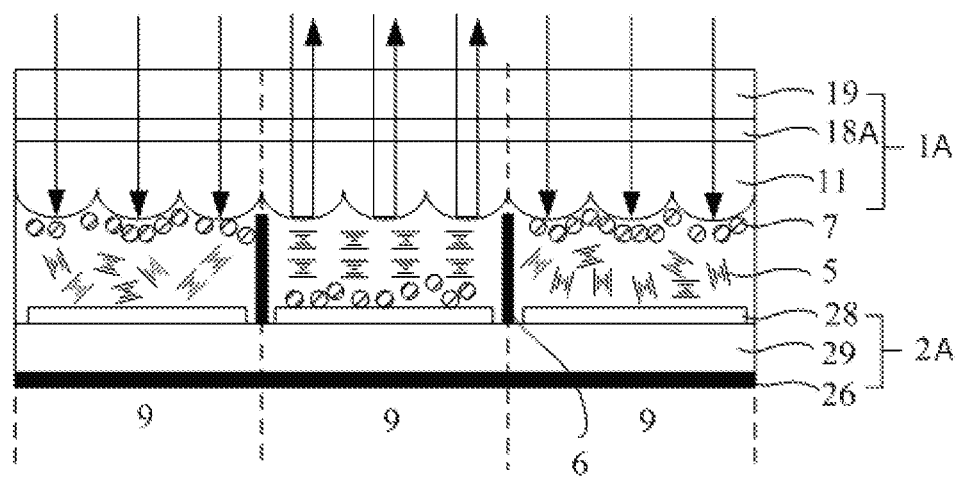
FIG. 2 is a schematic diagram showing a structure of another display panel according to embodiments of the present disclosure.

Embodiments of the present disclosure provide an electronic ink display panel. FIG. 1 is a schematic diagram showing a structure of the display panel according to the embodiments of the present disclosure. As shown in FIG. 1, in the electronic ink display panel, a transparent medium 8 (which may be, for example, an insulating dispersion liquid) is filled between a first substrate 1 and a second substrate 2, and charged light-absorbing particles (i.e., ink particles) 7 are mixed in the transparent medium 8. The light-absorbing particles 7 may be black particles. A plurality of hemisphere microstructures (collectively referred to as a total internal reflection structure) 11 facing to the transparent medium 8 are provided on a first base body 19 of the first substrate 1, and the hemisphere microstructures 11 are made of a resin having a large refractive index. A first electrode (e.g., a common electrode) 18 is provided on a surface of the hemisphere microstructures (total internal reflection structure) 11 facing to the second substrate 2, and a plurality of second electrodes 28 may be provided on a second base body 29 of the second substrate 2 (e.g., each of pixel units 9 may be provided with one second electrode 28 therein). The plurality of second electrodes 28 may be electrically insulated from each other. The first base body 19, the hemisphere microstructures 11, and the first electrode 18 may be made of different transparent materials. A user (viewer) of the display panel views information displayed on the display panel through the first substrate 1. Refractive indexes of the hemisphere microstructures 11, the first electrode 18, and the light-absorbing particles 7 are close to each other, and are all greater than a refractive index of the transparent medium 8. Movement of the light-absorbing particles 7 may be controlled by applying different driving voltages across the first electrode 18 and a corresponding second electrode 28. When the light-absorbing particles 7 are absorbed to a side of the second substrate 2, since the refractive index of the hemisphere microstructures 11 is greater than the refractive index of the transparent medium 8, at least a part of incident light entering the interior of the hemisphere microstructures 11 from the outside will be subjected to total internal reflection at a boundary between the hemisphere microstructures 11 and the transparent medium 8 and will be reflected back, thereby achieving a bright state. When the light-absorbing particles 7 are absorbed to a side of the first substrate 1, the hemisphere microstructures 11 are close to (as shown in FIG. 1) or in contact with (as shown in FIG. 2) the light-absorbing particles 7, and since the refractive indexes of the hemisphere microstructures 11 and the light-absorbing particles 7 are approximately identical, the incident light from the outside will not be subjected to total internal reflection or the part of the incident light being subjected to total internal reflection will be reduced. Thus, the incident light from the outside will pass through the hemisphere microstructures 11 and be absorbed by the light-absorbing particles 7, thereby achieving a dark state.

An embodiment of the present disclosure further provides another electronic ink display panel. FIG. 2 is a schematic diagram showing a structure of this display panel according to the embodiment of the present disclosure. To simplify the description, some explanations as those set forth above may be omitted hereinafter.

As shown in FIG. 2, the display panel according to the present embodiment includes a first substrate 1A and a second substrate 2A which are aligned and assembled into a cell, wherein the first substrate 1A includes a first base body 19, a total internal reflection structure 11 and a first electrode 18A are provided at a side of the first base body 19 facing to the second substrate 2A, and the second substrate 2A includes a second base body 29 and second electrodes 28 which are provided at a side of the second base body 29 facing to the first substrate 1A; and cholesteric liquid crystal 5 is provided between the first substrate 1A and the second substrate 2A, charged light-absorbing particles 7 are mixed in the cholesteric liquid crystal 5, and a refractive index of the cholesteric liquid crystal 5 is smaller than each of a refractive index of the total internal reflection structure 11 and a refractive index of the light-absorbing particles 7.

The display panel according to the present embodiment is an electronic ink display panel. As described above, the display panel includes the first substrate 1A, the second substrate 2A, the light-absorbing particles 7, etc., and the total internal reflection structure 11, which causes at least a part of incident light from the outside to be subjected to total internal reflection, is provided at an inner side (i.e., a side close to the second substrate 2A) of the first substrate 1A. The total internal reflection structure 11 is made of a material which has a greater refractive index than that of a filling medium (e.g., the cholesteric liquid crystal 5), and thus light traveling from the total internal reflection structure 11 to the cholesteric liquid crystal 5 tends to be subjected to total internal reflection at the boundary therebetween. Since the refractive index of the light-absorbing particles 7 is greater than the refractive index of the cholesteric liquid crystal 5, when the light-absorbing particles 7 are at a surface of the total internal reflection structure 11, total internal reflection of the incident light may not occur or a part of the incident light being subjected to total internal reflection may be reduced. Optionally, the light-absorbing particles 7 may have a refractive index equal to or greater than that of the total internal reflection structure 11, to have a better effect of preventing total internal reflection of the incident light from occurring. Further, since different cholesteric liquid crystal materials have different refractive indexes, for the cholesteric liquid crystal 5 in the present embodiment, a cholesteric liquid crystal material having a refractive index as small as possible may be selected, or a refractive index of a cholesteric liquid crystal material may be adjusted by adding an addition agent into the cholesteric liquid crystal material such that a refractive index of the cholesteric liquid crystal material added with the addition agent becomes smaller.

A medium filled between the substrates 1A and 2A of the display panel according to the present embodiment is the cholesteric liquid crystal 5. The cholesteric liquid crystal 5 has two stable states, which are a planar state (simply referred to as a P state, and also referred to as a planar texture) and a focal conic state (simply referred to as an Fc state, and also referred to as a focal conic texture). In the planar state, the cholesteric liquid crystal 5 is highly reflective, i.e., is in a high-reflectance state. In the focal conic state, the cholesteric liquid crystal 5 is transparent to the incident light from the outside, i.e., is in a transparent state. When to display in the bright state, the cholesteric liquid crystal 5 may be caused to be in the planar state (i.e., the high-reflectance state), so as to reflect the part of the incident light transmitting from the total internal reflection structure 11, thereby increasing the brightness. When to display in the dark state, the cholesteric liquid crystal 5 may be caused to be in the focal conic state (i.e., the transparent state), so that the cholesteric liquid crystal 5 will not reflect the part of the incident light transmitting from the total internal reflection structure 11 thus the brightness in the dark state will not be increased, i.e., the contrast will not decreased. Further, the above two states of the cholesteric liquid crystal 5 are both stable states, and thus a driving voltage is not required to maintain the bright state or the dark state. Therefore, the power consumption thereof can be reduced.

Optionally, the total internal reflection structure 11 includes a plurality of hemisphere microstructures protruding towards the second substrate 2A, and the display panel further includes a plurality of pixel units 9, each of which is provided with one or more of the hemisphere microstructures therein.

As an implementation, the total internal reflection structure 11 may include a plurality of microstructures each having a hemisphere shape, and the hemisphere microstructures protrude towards the interior of the display panel. Further, each pixel unit 9 (i.e., the smallest point that can perform display independently, such as a subpixel) of the display panel may include one or more of the plurality of hemisphere microstructures.

Optionally, the first electrode 18 is provided between the first base body 19 and the total internal reflection structure 11.

As shown in FIG. 2, the first electrode 18 is not provided on a surface of the total internal reflection structure (the hemisphere microstructures) 11 facing to the second substrate 2A, but is provided between the total internal reflection structure 11 and the first base body 19 (e.g., is provided directly on a surface of the first base body 19). By doing so, the first electrode 18 may be manufactured on a base body having a substantially planar surface. Thus, the difficulty of manufacture is low, and a resultant electric field is uniform (i.e., is a standard vertical electric field).

Optionally, each of the second electrodes 28 is made of a transparent conductive material.

As described above, by adopting the cholesteric liquid crystal 5, the solution according to the present embodiment can increase the reflectance in the bright state significantly. Thus, the second electrode 28 may not be made of a reflective material, but of a transparent material such as indium tin oxide (ITO), indium zinc oxide (IZO), or the like, so as to avoid reduction of contrast due to the second electrode 28 reflecting any light irradiating thereon in the dark state.

As described above, since the incident light from the outside must pass through the first electrode 18 for displaying, the first electrode 18 should be made of a transparent conductive material, and detailed description thereof is omitted herein.

Optionally, the second substrate 2A further includes a light-absorbing layer 26.

As described above, since the second electrode 28 is not required to reflect the incident light in present embodiment, the light-absorbing layer 26, which absorbs light irradiating thereon, can be directly provided on the second substrate 2A (e.g., between the second base body 29 and each of the second electrodes 28, or at a side of the second base body 29 far away from the first substrate 1A), so that reduction of contrast can be avoided due to light irradiating on the second substrate 2A being reflected, thereby further improving the display effect.

Optionally, the display panel further includes a plurality of pixel units 9, and a light-absorbing wall 6 is provided between any two adjacent ones of the pixel units 9. Further optionally, the light-absorbing wall 6 is provided on the second substrate 2A. The light-absorbing wall 6 may have a black color.

In the dark state, there may be a small part of the incident light passing through the light-absorbing particles 7 and entering into the cholesteric liquid crystal 5. In order to avoid reduction of contrast due to this part of incident light being emitted from the first substrate 1A after being subjected to a series of reflection in the pixel units 9, the light-absorbing wall 6, which is made of a light-absorbing material, may be provided between any two adjacent ones of the pixel units 9 (i.e., at an edge of each of the pixel units 9), such that propagation of this part of incident light is prevented.

Further, since the total internal reflection structure 11 is generally in the form of hemisphere microstructure or the like, it is relatively difficult to provide the light-absorbing wall 6 on a surface of the hemisphere microstructure. Thus, the light-absorbing wall 6 may be provided on the second substrate 2A.

Optionally, the first electrode 18A is a common electrode, and each of the second electrodes 28 is a pixel electrode.

In consideration of simplifying a structure, one kind of electrode of the first electrode 18A and the second electrodes 28 may be provided with a common voltage which is the same across said one kind of electrode, and said one kind of electrode is referred to as a common electrode; whereas the other kind of electrode thereof may be independently and may be provided with different voltages in respective pixel units 9, and said other kind of electrode is referred to as a pixel electrode. To provide different pixel electrodes in respective pixel units 9 with different data voltages, a driving circuit such as a thin film transistor array may be provided. Since the second substrate 2A does not include complicated structures such as the hemisphere microstructures, the driving circuit may be provided therein. Further, the first electrode 18A may be a common electrode, and the second electrodes 28 may be pixel electrodes.

Another embodiment of the present disclosure further provides a driving method of the display panel according to the present disclosure, wherein a number of the second electrodes is equal to or greater than 2, and the driving method includes steps of:

when any one of the pixel units 9 is to enter into a bright state, applying a first driving voltage across the first electrode 18A and the corresponding second electrode 28, such that the light-absorbing particles 7 are absorbed on the second substrate 2A, and the cholesteric liquid crystal 5 is in a planar state; and when any one of the pixel units 9 is to enter into a dark state, applying a second driving voltage across the first electrode 18A and the corresponding second electrode 28, such that the light-absorbing particles 7 are absorbed on the first substrate 1A, and the cholesteric liquid crystal 5 is in a focal conic state.

That is, when a certain pixel unit 9 of the display panel is to enter into the bright state (e.g., switch from the dark state to the bright state, or enter into the bright state directly after starting up), the first driving voltage is applied across the first electrode 18A and the corresponding second electrode 28, such that the light-absorbing particles 7 are absorbed on the second substrate 2A, and the cholesteric liquid crystal 5 enters the planar state (i.e., the high-reflectance state). Thus, at least a part of incident light from the outside is allowed to be subjected to total internal reflection at a surface of the total internal reflection structure 11 facing to the second substrate 2A, and the rest of the incident light passing through the surface is reflected back by the cholesteric liquid crystal 5 being in the planar state (i.e., the high-reflectance state). As a result, the brightness in the bright state is increased.

When a certain pixel unit 9 of the display panel is to enter into the dark state (e.g., switch from the bright state to the dark state, or enter into the dark state directly after starting up), the second driving voltage (which has a magnitude different from that of the first driving voltage, and may have a direction opposite to that of the first driving voltage) may be applied to the first electrode 18 A and the corresponding second electrode 28, such that the light-absorbing particles 7 are absorbed on the first substrate 1A, and the cholesteric liquid crystal 5 enters into the focal conic state (i.e., the transparent state). Thus, total internal reflection of the incident light from the outside will not occur or the part of the incident light being subjected to total internal reflection is reduced. The part of the incident light not being subjected to total internal reflection will be absorbed by the light-absorbing particles 7. If there is still a portion of the incident light passing through the light-absorbing particles 7, this portion of the incident light will be absorbed by the light-absorbing layer 26 and will not be reflected back to the first electrode 18A. In such a way, display contrast of the display panel in the dark state will not be decreased.

Optionally, the driving method further includes steps of: when the pixel unit 9 is to be maintained in the bright state, cancelling application of the first driving voltage across the first electrode 18A and the corresponding second electrode 28; and when the pixel unit 9 is to be maintained in the dark state, cancelling application of the second driving voltage across the first electrode 18A and the corresponding second electrode 28.

Another embodiment of the present disclosure further provides another driving method of the display panel according to the present disclosure, wherein a number of the first electrodes is equal to or greater than 2, and the driving method includes steps of:

when any one of the pixel units 9 is to enter into a bright state, applying a first driving voltage across the second electrode 28 and the first electrode 18A corresponding to the pixel unit 9, such that the light-absorbing particles 7 are absorbed on the second substrate 2A, and the cholesteric liquid crystal 5 is in a planar state; and when any one of the pixel units 9 is to enter into a dark state, applying a second driving voltage across the second electrode 28 and the first electrode 18A corresponding to the pixel unit 9, such that the light-absorbing particles 7 are absorbed on the first substrate 1A, and the cholesteric liquid crystal 5 is in a focal conic state.

Optionally, the driving method further includes steps of: when the pixel unit 9 is to be maintained in the bright state, cancelling application of the first driving voltage across the second electrode 28 and the first electrode 18A corresponding to the pixel unit 9; and when the pixel unit 9 is to be maintained in the dark state, cancelling application of the second driving voltage across the second electrode 28 and the first electrode 18A corresponding to the pixel unit 9.

In the electronic ink display panel according to embodiments of the present disclosure, the light-absorbing particles 7 may remain stable without an electric field after being absorbed to a certain position, and the two states of the cholesteric liquid crystal 5 are both stable states (i.e., the cholesteric liquid crystal 5 has bistable states). Thus, after a certain pixel unit 9 of the display panel enters into a specific state (e.g., the bright state), if the pixel unit 9 is desired to maintain the state (e.g., the bright state) for a period of time, it is not required to apply any voltage across the first electrode 18A and the second electrode 28 during the period of time anymore, thereby achieving the effect of reducing power consumption.

It should be understood that, the above embodiments are only exemplary embodiments for the purpose of explaining the principle of the present disclosure, and the present disclosure is not limited thereto. For one of ordinary skill in the art, various improvements and modifications may be made without departing from the spirit and essence of the present disclosure. These improvements and modifications also fall within the protection scope of the present disclosure.

What is claimed is:

1. A display panel, comprising a first substrate and a second substrate which are aligned and assembled into a cell, wherein the first substrate comprises a first base body, a total internal reflection structure and a first electrode are provided at a side of the first base body facing to the second substrate, the second substrate comprises a second base body and a second electrode which is provided at a side of the second base body facing to the first substrate; and the display panel further comprises cholesteric liquid crystal provided between the first substrate and the second substrate, charged light-absorbing particles are mixed in the cholesteric liquid crystal; and a refractive index of the cholesteric liquid crystal is smaller than each of a refractive index of the total internal reflection structure and a refractive index of the light-absorbing particles.

2. The display panel according to claim 1, wherein the total internal reflection structure comprises a plurality of hemisphere microstructures protruding towards the second substrate; and the display panel further comprises a plurality of pixel units, each of which is provided with one or more of the hemisphere microstructures therein.

3. The display panel according to claim 1, wherein the first electrode is provided between the first base body and the total internal reflection structure.

4. The display panel according to claim 1, wherein the second electrode is made of a transparent conductive material.

5. The display panel according to claim 1, wherein the second substrate further comprises a light-absorbing layer.

6. The display panel according to claim 1, wherein the display panel further comprises a plurality of pixel units, and a light-absorbing wall is provided between any two adjacent ones of the pixel units.

7. The display panel according to claim 6, wherein the light-absorbing wall is provided on the second substrate.

8. The display panel according to claim 1, wherein the first electrode is a common electrode, and the second electrode is a pixel electrode.

9. A driving method of the display panel according to claim 1, wherein a number of the second electrodes is equal to or greater than 2, and the driving method comprises steps of:

when any one of the pixel units is to enter into a bright state, applying a first driving voltage across the first electrode and the second electrode corresponding to the pixel unit, such that the light-absorbing particles are absorbed on the second substrate, and the cholesteric liquid crystal is in a planar state; and when any one of the pixel units is to enter into a dark state, applying a second driving voltage across the first electrode and the second electrode corresponding to the pixel unit, such that the light-absorbing particles are absorbed on the first substrate, and the cholesteric liquid crystal is in a focal conic state.

10. The driving method according to claim 9, further comprising steps of:

when the pixel unit is to be maintained in the bright state, cancelling application of the first driving voltage across the first electrode and the second electrode corresponding to the pixel unit; and when the pixel unit is to be maintained in the dark state, cancelling application of the second driving voltage across the first electrode and the second electrode corresponding to the pixel unit.

11. A driving method of the display panel according to claim 1, wherein a number of the first electrodes is equal to or greater than 2, and the driving method comprises steps of:

when any one of the pixel units is to enter into a bright state, applying a first driving voltage across the second electrode and the first electrode corresponding to the pixel unit, such that the light-absorbing particles are absorbed on the second substrate, and the cholesteric liquid crystal is in a planar state; and when any one of the pixel units is to enter into a dark state, applying a second driving voltage across the second electrode and the first electrode corresponding to the pixel unit, such that the light-absorbing particles are absorbed on the first substrate, and the cholesteric liquid crystal is in a focal conic state.

12. The driving method according to claim 11, further comprising steps of:

when the pixel unit is to be maintained in the bright state, cancelling application of the first driving voltage across the second electrode and the first electrode corresponding to the pixel unit; and when the pixel unit is to be maintained in the dark state, cancelling application of the second driving voltage across the second electrode and the first electrode corresponding to the pixel unit.

* * * * *